United States Patent [19]
Tsosie

[11] Patent Number: 5,886,730
[45] Date of Patent: Mar. 23, 1999

[54] SECURITY SYSTEM FOR DISABLING AN ELECTRONIC DEVICE

[76] Inventor: Harold Tsosie, P.O. Box 1936, Window Rock, Ariz. 86515

[21] Appl. No.: 911,548

[22] Filed: Aug. 14, 1997

[51] Int. Cl.[6] .................................................. H04N 7/167
[52] U.S. Cl. ............................ 348/5.5; 348/563; 348/553
[58] Field of Search ........................... 348/5.5, 731, 734, 348/10, 553, 563

[56] References Cited

U.S. PATENT DOCUMENTS

| | | |
|---|---|---|
| 4,459,585 | 7/1984 | Pasternak .............................. 348/578 X |
| 5,045,947 | 9/1991 | Beery . |
| 5,719,618 | 2/1998 | Park ........................................ 348/5.5 |

Primary Examiner—Nathan Flynn

[57] ABSTRACT

A security system is provided including an electronic device allowing the use thereof during normal operation, a lock button adapted to transmit a lock signal upon the depression thereof, and an alphanumeric keypad for allowing the entry of a password. Further provided is a control mechanism having a first mode upon the entry of a proper password wherein the electronic device is allowed normal operation and a second mode upon the receipt of the lock signal wherein the control mechanism is adapted to preclude the normal operation of the electronic device.

2 Claims, 4 Drawing Sheets

SECURITY SYSTEM FOR DISABLING AN ELECTRONIC DEVICE

BACKGROUND OF THE INVENTION

1. Field of the Invention

The present invention relates to anti-theft devices and more particularly pertains to a new security system for disabling an electronic device for deterring the theft of electronic devices by only allowing their use by authorized persons.

2. Description of the Prior Art

The use of anti-theft devices is known in the prior art. More specifically, anti-theft devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art anti-theft devices include U.S. Pat. No. 5,382,983; U.S. Pat. No. 4,510,623; U.S. Pat. No. 5,168,372; U.S. Pat. No. 5,162,638; U.S. Pat. No. 4,348,696; and U.S. Pat. No. 5,097,260.

In these respects, the security system for disabling an electronic device according to the present invention substantially departs from the conventional concepts and designs of the prior art, and in so doing provides an apparatus primarily developed for the purpose of providing a device for deterring the theft of electronic devices by only allowing their use by authorized persons.

SUMMARY OF THE INVENTION

In view of the foregoing disadvantages inherent in the known types of anti-theft devices now present in the prior art, the present invention provides a new security system for disabling an electronic device construction wherein the same can be utilized for deterring the theft of electronic devices by only allowing their use by authorized persons.

The general purpose of the present invention, which will be described subsequently in greater detail, is to provide a new security system for disabling an electronic device apparatus and method which has many of the advantages of the anti-theft devices mentioned heretofore and many novel features that result in a new security system for disabling an electronic device which is not anticipated, rendered obvious, suggested, or even implied by any of the prior anti-theft devices, either alone or in any combination thereof.

To attain this, the present invention essentially comprises a television having a screen. The television is adapted to receive television signals and transmit the same to the display during normal operation. Further provided is a lock button situated on the television and adapted to transmit a lock signal upon the depression thereof. Next, an alphanumeric keypad is situated on the television for allowing the manual entry of a password. Memory means is included for storing a password therein. For controlling the operation of the present invention, control means is connected to the television, lock button, memory means, and alphanumeric keypad. The control means has a first mode upon the entry of a proper password. In such mode, the television is allowed normal operation. Upon the receipt of the lock signal, the control means has a second mode wherein the control means is adapted to preclude the normal operation of the television, to display information on the screen identifying an owner of the television, and to prompt for the entry of the password.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new security system for disabling an electronic device apparatus and method which has many of the advantages of the anti-theft devices mentioned heretofore and many novel features that result in a new security system for disabling an electronic device which is not anticipated, rendered obvious, suggested, or even implied by any of the prior art anti-theft devices, either alone or in any combination thereof.

It is another object of the present invention to provide a new security system for disabling an electronic device which may be easily and efficiently manufactured and marketed.

It is a further object of the present invention to provide a new security system for disabling an electronic device which is of a durable and reliable construction.

An even further object of the present invention is to provide a new security system for disabling an electronic device which is susceptible of a low cost of manufacture with regard to both materials and labor, and which accordingly is then susceptible of low prices of sale to the consuming public, thereby making such security system for disabling an electronic device economically available to the buying public.

Still yet another object of the present invention is to provide a new security system for disabling an electronic device which provides in the apparatuses and methods of the prior art some of the advantages thereof, while simultaneously overcoming some of the disadvantages normally associated therewith.

Still another object of the present invention is to provide a new Device for deterring the theft of electronic devices by only allowing their use by authorized persons.

Even still another object of the present invention is to provide a new security system for disabling an electronic device that includes an electronic device allowing the use thereof during normal operation, a lock button adapted to transmit a lock signal upon the depression thereof, and an alphanumeric keypad for allowing the entry of a password. Further provided is a control mechanism having a first mode upon the entry of a proper password wherein the electronic device is allowed normal operation and a second mode upon the receipt of the lock signal wherein the control mechanism is adapted to preclude the normal operation of the electronic device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
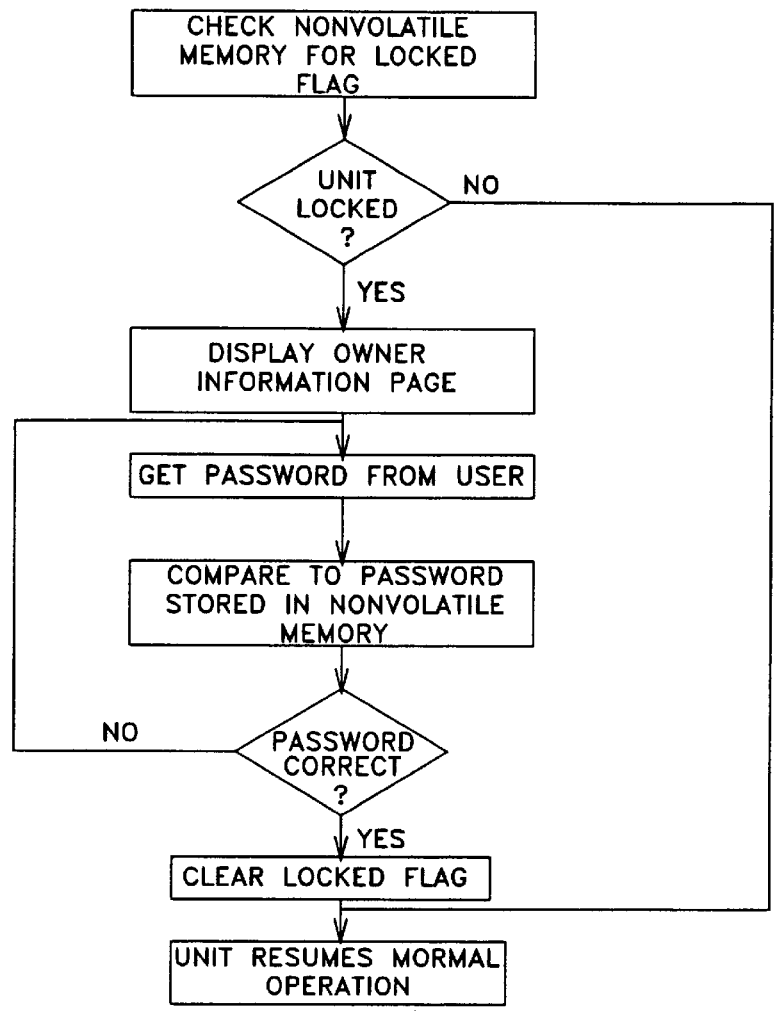
FIG. 1 is a flow chart delineating the method of the present invention associated with the retrieval and verification of the password.

With reference now to the drawings, a new security system for disabling an electronic device embodying the principles and concepts of the present invention and generally designated by the reference numeral 10 will be described.

Specifically, the system 10 of the present invention includes a television 12 having a screen 14. The television is adapted to receive television signals via free space and by cable and transmit the same to the display during normal operation. Further provided is a lock button 16 situated on the television and adapted to transmit a lock signal upon the depression thereof. Next, an alphanumeric keypad 18 is situated on the television for allowing the manual entry of a password. Memory means is included for storing a password therein. Preferably, the memory means takes the form of a nonvolatile memory device such as an EEPROM. Such chip is soldered to a circuit board within the television to preclude a thief from disabling it. If the chip is removed or tampered with, the remaining circuitry is ideally adapted to disable the unit. It should be noted that, in the alternative, the lock button and the alphanumeric keypad may be situated on a remote control and the signals associated therewith may be transmitted to the television via free space. Also, in further alternate embodiments, the keypad and lock button may be situated on any electronic device equipped with a liquid crystal display or the like.

For controlling the operation of the present invention, control means is connected to the television, lock button, memory means, and alphanumeric keypad. The control means has a first mode upon the entry of a proper password. In such mode, the television is allowed normal operation. Upon the receipt of the lock signal, the control means has a second mode wherein the control means is adapted to preclude the normal operation of the television, to display information on the screen identifying an owner of the television, and to prompt for the entry of the password.

Figure 2:
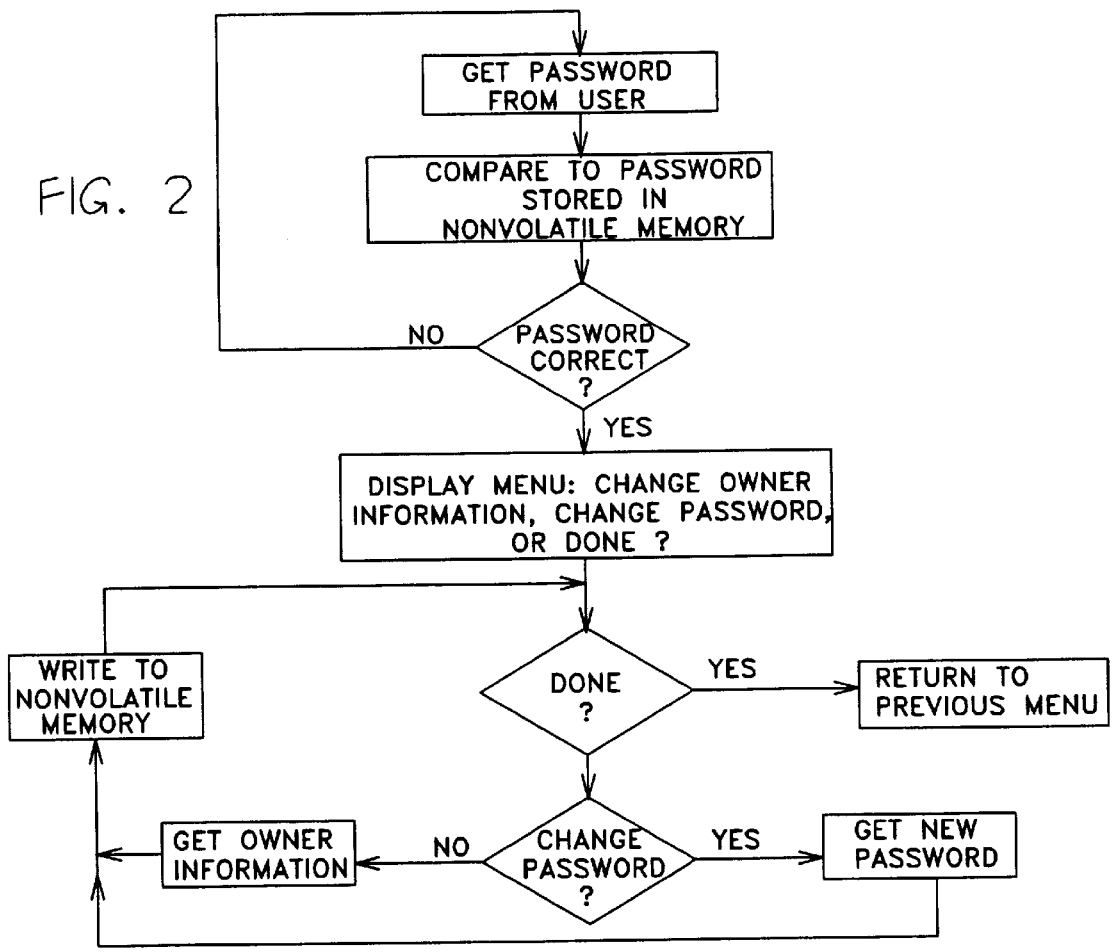
FIG. 2 is a flow chart delineating the operation of the method of the present invention associated with the changing of the identifying information and password.
Figure 3:
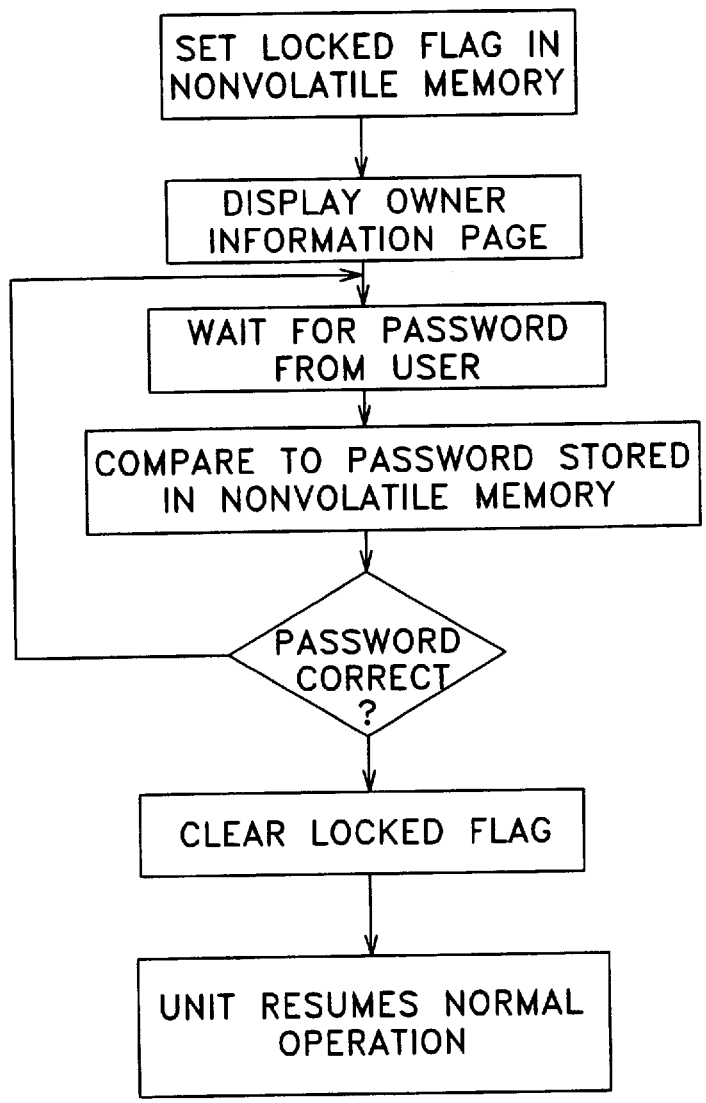
FIG. 3 is another flowchart depicting the method of the present invention upon the depression of the lock button.
Figure 4:
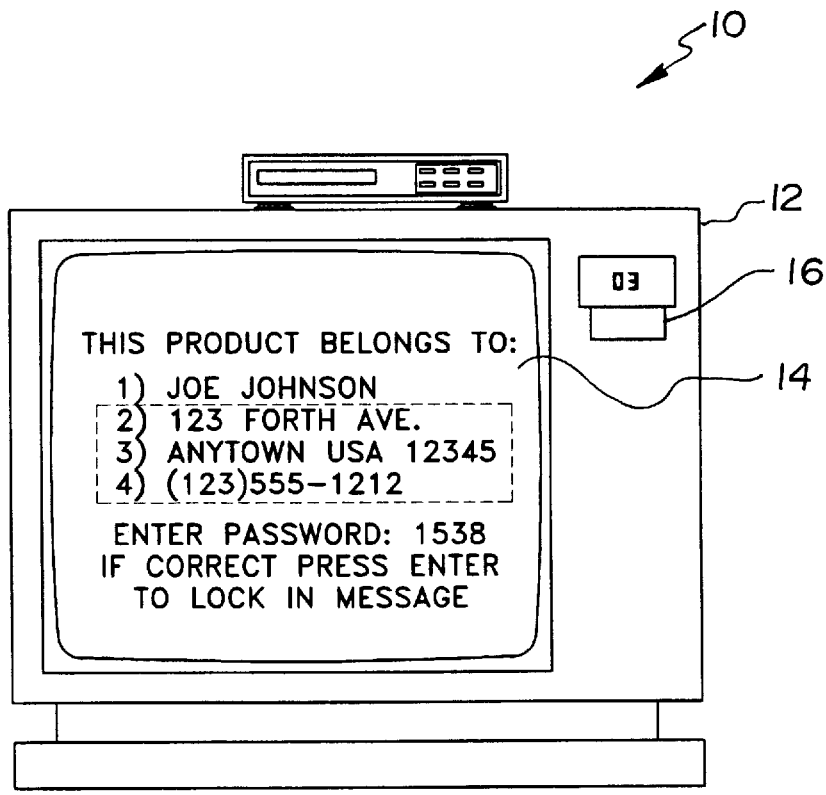
FIG. 4 is a front view of the apparatus of the present invention.

The method associated with the present invention will now be set forth. As shown in FIG. 1, the control means begins by checking whether the lock signal has been transmitted without the subsequent entry of the proper password. As shown in FIG. 1, such check is done upon each actuation of the television. Upon the entry of the proper password or lack of receipt of the lock signal, the control means functions in the first mode of operation thereby allowing normal operation of the television. On the other hand, upon the receipt of the lock signal without the subsequent entry of the proper password the control means operates in the second mode thereof. Note FIG. 2. In the second mode of operation, the information identifying an owner of the television is displayed. As shown in FIG. 4, the screen depicts the owner's name, address, and phone number. Further, the screen requests the entry of the password. Once the password is entered, it is compared with the password stored in the memory means. If the comparison is successful, a menu is displayed on the screen which prompts the user to effect one of a plurality of functions. Such functions include allowing normal operation of the television, changing the information identifying an owner of the television, and changing the password stored in the memory means. If a change is requested, the control means displays on the screen a request for the entry of such information. It should be noted that upon the purchase of the television, a default password and user information is stored in the memory means.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A security system comprising, in combination:
   a television having a screen, the television adapted to receive television signals and transmit the same to the display during normal operation;
   a lock button situated on the television and adapted to transmit a lock signal upon the depression thereof;
   a keypad situated on the television for allowing the manual entry of a password; and control means connected to the television, lock button, and keypad, the control means having a first mode upon the entry of a proper password wherein the television is allowed normal operation and a second mode upon the receipt of the lock signal during which the control means is adapted to preclude the normal operation of the television, to display information on the screen identifying an owner of the television, to prompt for the entry of the password, and to display a menu on the screen upon the entry of the proper password, wherein the menu prompts the user to effect one of a plurality of functions including changing the information identifying the owner of the television and changing the password.

2. A method of preventing the use of a television by an unauthorized person comprising the steps of:

providing a television having a screen, the television adapted to receive television signals and transmit the same to the display during normal operation;

providing a lock button situated on the television and adapted to transmit a lock signal upon the depression thereof;

providing an alphanumeric keypad situated on the television for allowing the manual entry of a password;

providing memory means for storing a password therein;

providing control means connected to the television, lock button, memory means, and alphanumeric keypad, the control means having a first mode upon the entry of a proper password wherein the television is allowed normal operation and a second mode upon the receipt of the lock signal wherein the control means is adapted to preclude the normal operation of the television, to display information on the screen identifying an owner of the television, and to prompt for the entry of the password;

checking whether the lock signal has been transmitted without the subsequent entry of the proper password;

effecting the first mode of operation upon the receipt of the lock signal with the subsequent entry of the proper password thereby allowing normal operation of the television;

effecting the first mode of operation upon the lack of receipt of the lock signal thereby allowing normal operation of the television; and effecting the second mode of operation of the control means only upon the receipt of the lock signal without the subsequent entry of the proper password, wherein upon the control means being in the second mode thereof, the method further includes the steps of:

displaying the information identifying an owner of the television, prompting the entry of the password, comparing the password entered with that stored in the memory means, and displaying a menu on the screen upon the entry of the correct password, wherein the screen prompts the user to effect one of a plurality of functions including allowing normal operation of the television, changing the information identifying an owner of the television, and changing the password stored in the memory means.

* * * * *